Nov. 26, 1968  B. P. FUCHS  3,412,541
ASPARAGUS HARVESTER
Filed March 4, 1966  2 Sheets-Sheet 1
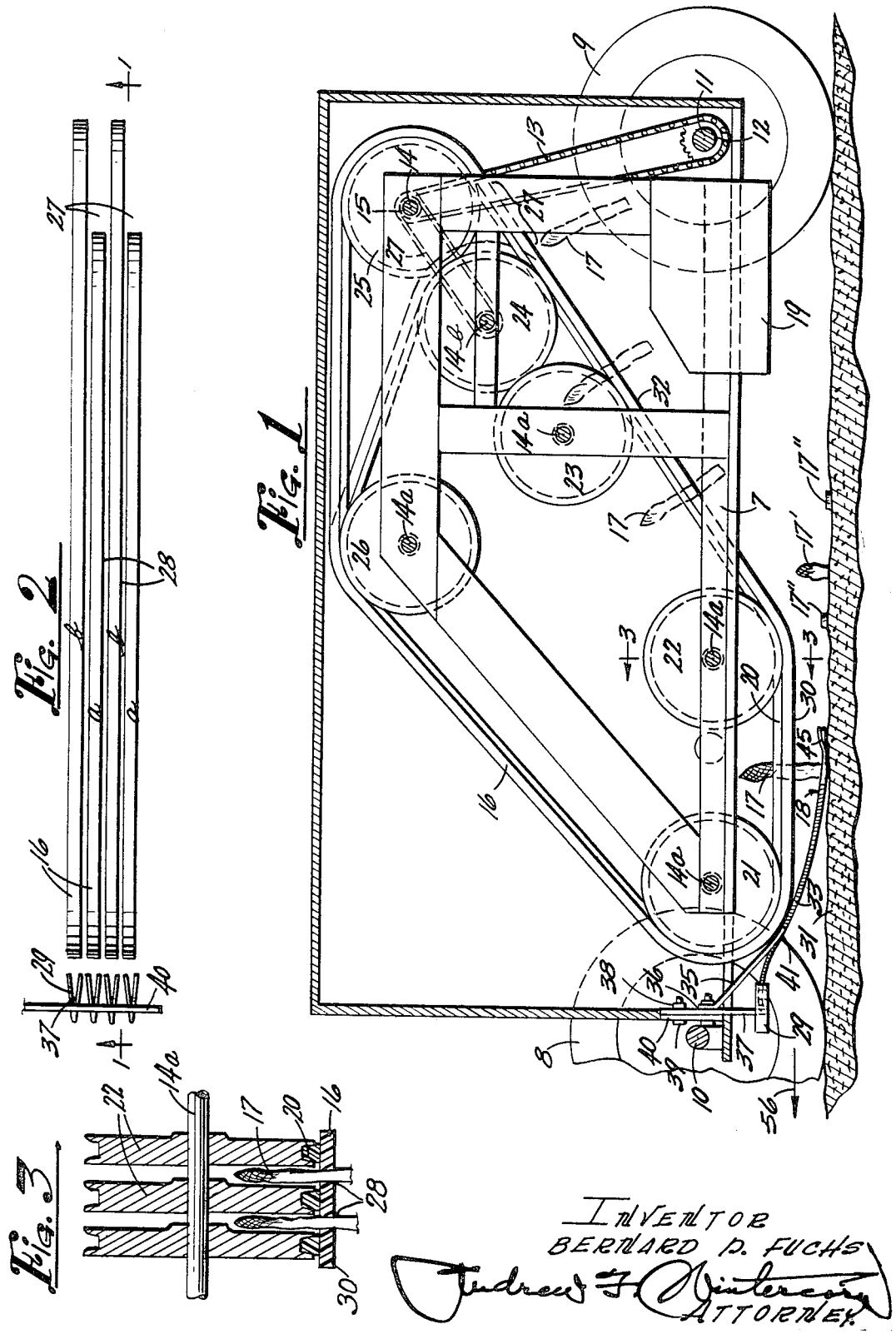

Nov. 26, 1968   B. P. FUCHS   3,412,541
ASPARAGUS HARVESTER
Filed March 4, 1966   2 Sheets-Sheet 2
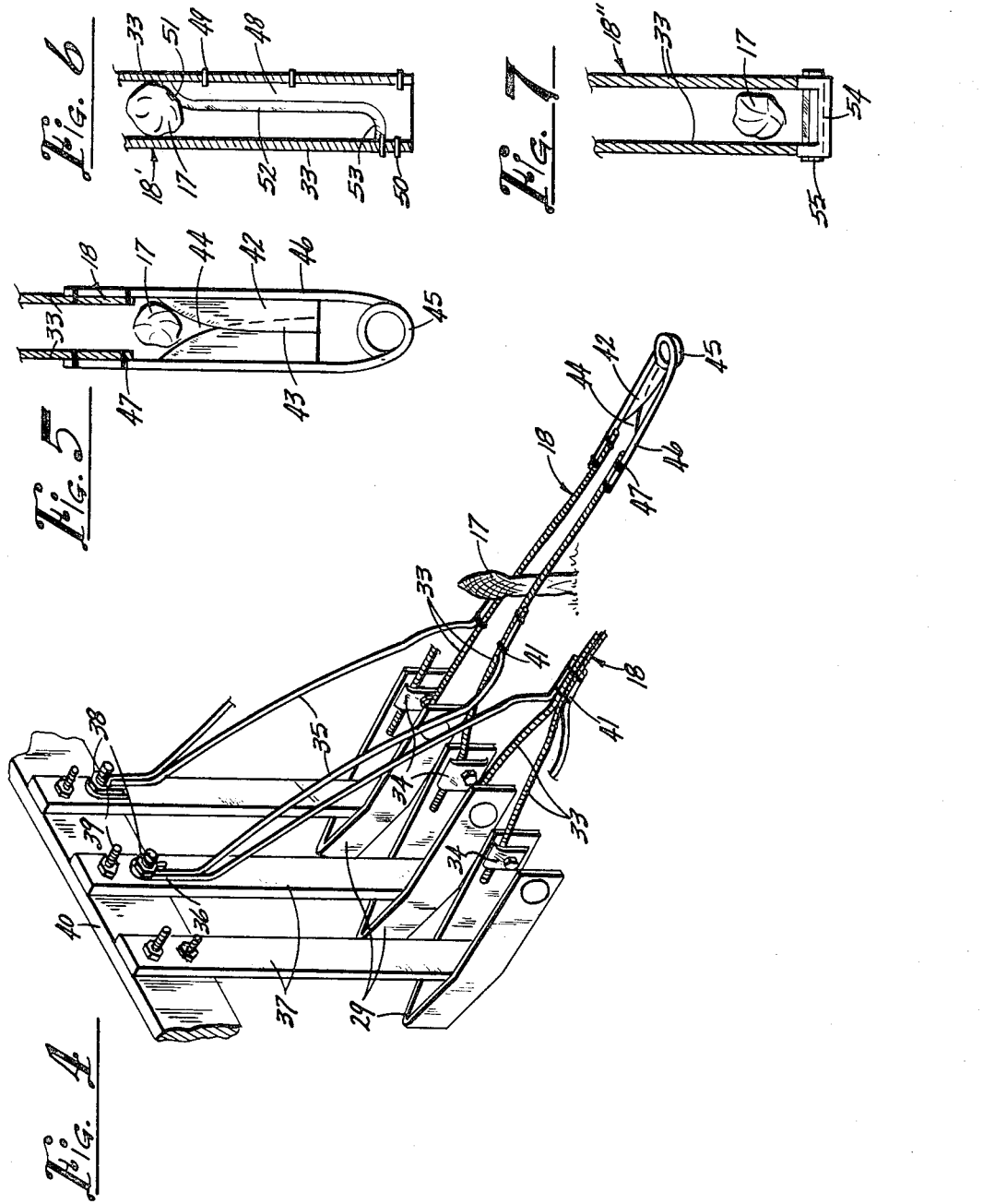
INVENTOR
BERNARD P. FUCHS
ATTORNEY United States Patent Office 3,412,541
Patented Nov. 26, 1968

3,412,541
ASPARAGUS HARVESTER
Bernard P. Fuchs, R.R. 3, Rochelle, Ill. 61068
Filed Mar. 4, 1966, Ser. No. 531,702
16 Claims. (Cl. 56—327)

ABSTRACT OF THE DISCLOSURE

In this asparagus harvesting machine, closely spaced endless belts have a horizontal flight at a predetermined elevation relative to the ground, depending on the length of spears to be cut, these belts being designed to take hold on opposite sides of the spears that are long enough to be cut, and, after they are cut off at ground level, convey them upwardly to a drop-off point into a receptacle disposed therebelow. The belts travel at the ground speed of the machine and are driven by a power take-off from an axle turning with the supporting wheels. A snare cooperates with each of the passageways between neighboring cooperating belts, being attached preferably between the dividers disposed in front of the forward pulleys, so that each incoming standing spear passing between a pair of neighboring dividers is entered in the snare and, since the rear end of the snare is dragged on the ground and has cutting means thereon to cut off the spear at or about ground level, the spear is cut off in time to be conveyed upwardly to the drop-off point. Each snare comprises a pair of elongated, easily flexible side members having upwardly diverging front end portions adapted to receive a standing spear therebetween, the rest of each snare snaking harmlessly in and out, around and between other standing spears of asparagus. The cutting means on the trailing end of the snare may be any one of a number of forms, a preferred form being a generally L-shaped blade, one arm of which extends in a forward direction in the trailing end of the snare and has a cutting edge along its inner side and front end portion, the other arm of the L extending transversely at the rear end of the first arm and having a cutting edge on the front thereof so as to cut the snared spear from the rear as the snare moves forward.

This invention relates to an asparagus harvesting machine.

Asparagus harvesting has thus far been done by hand, and mostly with imported labor, because American labor apparently regards it as too back-breaking and not sufficient remunerative. However, it appears that legislation recently enacted prohibits importation of this labor and, hence, there is an immediate necessity for mechanization, but unfortunately, there are no successful machines available to do this work. It is, therefore, the principal object of my invention to provide an asparagus harvester of practical and useful design well adapted for the needs of this particular type of work, fully capable of singling out and severing only the spears that are seven inches long or longer, while leaving undisturbed and unharmed all spears that are of less than the predetermined length mentioned, so that these others may be harvested on the next pass through the bed the following day when they have attained the desired length.

A salient feature of the machine of my invention is the arrangement of soft rubber belts in spacing parallel relation carried on V-belts that run on coaxially spaced pulleys, the soft rubber belts of each pair projecting laterally in opposite directions from their V-belts toward one another to take hold of opposite sides of each spear, the pulleys at the entrance end of the machine being evenly spaced allowing easy entrance of the spears between the soft rubber belts so that they are grabbed immediately and cut soon after that, the cut spears being thereafter conveyed between the same belts to an elevated point of release where they are dropped, the belts running parallel to the ground at ground speed at a predetermined elevation so that only spears of the requisite length will be harvested and the rest passed for harvesting on the following day when they may have attained the desired length.

Another salient feature of the machine of my invention is its improved cutting means, one of which is provided for each of the passageways between neighboring cooperating belts in the form of a snare that is attached to the machine with its two side portions on opposite sides of each passageway, the dividers disposed in front of the forward pulleys furnishing a good place to attach the snares, so that each incoming standing spear, once it passes between a pair of neighboring dividers, is immediately entered in the snare provided for that passageway, the snare dragging on the ground and having a sharp cutting edge or edges at the rear end to cut off the spear at or about ground level, each snare being readily flexible laterally as well as up and down so that the cutter on the trailing end is free to follow the contour of the ground while the snare flexes to the right or left from the center line of the passageway as the location of a spear requires, only the spears in the snares being therefore cut off, all others being left undisturbed and unharmed. Spring arms on opposite sides of each snare at the front end serve to keep the sides of the snare closed on one another so that only the spears passing through the passageway can enter and pass along in the snare to the cutting point.

Still another salient feature of the present machine is the conveying of the cut spears on the same belts rearwardly and then upwardly on an incline to a drop-off zone in the rear portion of the machine, where the spears drop into a container or onto a transversely running conveyor belt, the spears being dropped in the simplest way by having alternate belts shorter than the rest and extending over a separate set of pulleys in forwardly spaced relation to the other set on which the intermediate belts operate, the spears dropping through such a small distance and being furthermore so inclined in relation to the container or conveyer belt at the drop-off point so that there is no likelihood of any damage to the tender head ends, as the tougher lower ends bear the brunt of the slight impact in landing in the container or on the conveyor belt. Also, due to the inclination of these spears at the point of dropping, the head ends are always disposed in one direction, thereby facilitating subsequent handling.

My novel arrangement of belts and pulleys is well adapted to the standard thirty inch width of asparagus beds as the set of belts covers the full width of the bed to harvest all spears seven inches and longer that are ready for harvesting, leaving for the next pass the following day all spears that are less than seven inches long and are not therefore grabbed between the belts and cut off at or near ground level. With the close spacing of the belts, the dividers disposed in front of the foremost pulleys deflecting spears to the right and to the left into position for passing between the belts are not apt to cause enough deflection of any spears to one side or the other to be at all harmful or affect the efficient operation of the snares in any way.

The invention is illustrated in the accompanying drawings, in which—

FIG. 1 is a longitudinal section through an asparagus harvester with snare-type cutter means made in accordance with my invention, this view being taken on the line 1–1 of FIG. 2;

FIG. 2 is a top view of a portion of the machine seen in FIG. 1;

FIG. 3 is a sectional detail on the line 3—3 of FIG. 1;

FIG. 4 is a perspective view of one of the snares on a larger scale, and

FIGS. 5, 6, and 7 are further enlarged views of the trailing cutting ends of a snare showing three different types of blades, FIG. 5 showing scissors type cutting blades, the same as in FIG. 4, while FIG. 6 illustrates an L-shaped cutting blade, and FIG. 7 shows a straight transversely extending cutting blade designed to be easily replaced in the special holder.

Similar reference numerals are applied to corresponding parts throughout these views.

Referring to the drawings, the reference numeral 7 designates a generally rectangular frame that is wide enough to span a bed of asparagus, and is supported on a pair of front wheels 8 and another pair of rear wheels 9, the wheels running in the furrows on the opposite sides of the bed as the machine is either pulled or pushed along by means of a tractor or the like. Several machines may be run in a gang for large scale harvesting of asparagus from a number of rows at one time, using only one tractor to push or pull all of these machines, as it will be obvious from the drawings and description that very little power is required in this operation. The front wheels 8 are interconnected by an axle 10, and the rear wheels 9 are connected by another axle 11, the two axles being received in suitable bearings in the frame. The rear axle 11 carries a sprocket 12 over which a chain 13 runs to transmit drive to a cross-shaft 14 by means of another sprocket 15 on that shaft, and thus through this simple means drive is transmitted to all of the spear contacting belts 16. These are made of soft rubber and run parallel to the ground at approximately the same speed as the machine, there being two of these belts arranged to engage the opposite sides of each spear of asparagus 17 and hold it just firmly enough to enable conveying it from the point of its being cut by a snare 18 to the point of dropping the spear later into a container 19, or onto a conveyer belt running transversely of the machine at its rear portion. The soft rubber belts 16 are carried on harder V-belts 20 that run in pulleys 21–26 provided in six banks, four of which are at the four corners of a parallelogram, as seen at 21, 22, 25, and 26, the fifth and sixth banks of pulleys 23 and 24 being between the two banks of pulleys 22 and 25, and all six banks being mounted on parallel cross shafts. The shaft 14 previously mentioned as being the driving shaft carries the bank of pulleys 25, while four of the other shafts 14a are idler shafts serving to carry the other banks of pulleys 21, 22, 23, and 26, but shaft 14b carrying pulleys 24 is a second driving shaft connected by a chain and sprockets with the shaft 14, as indicated at 27. The shafts 14, 14a, and 14b are all mounted in suitable bearings on opposite sides of the frame 7 and its upward extensions. The soft rubber belts 16 project laterally from the V-belts 20 toward one another as seen in FIG. 3 to have gripping engagement with opposite sides of a spear 17 and support the spear clear of the pulleys. The soft rubber belts 16 run in closely spaced parallel relation, as seen in FIG. 2, alternate belts a running on drive pulleys 24 while intermediate belts b run on drive pulleys 25, thereby defining drop-off points, indicated at 27 in FIGS. 1 and 2, directly over the container 19 or conveyer belt, where the spears reach the ends of passageways 28 between the cooperating belts 16. V-shaped dividers 29 disposed vertically in front of and aligned with the front ends of the belts 16 serve to deflect some of the taller spears to the left into one passageway 28 and others to the right into the next passageway 28, so that no spears that are seven inches long or longer will be missed in the harvesting. The lowermost flight 30 of the belts is spaced slightly less than seven inches from the ground indicated at 31 so that only spears 17 that are of the right length will be taken hold of by the belts 16 and pass through the passageways 28 for cutting by the snares 18 in front of pulleys 22. All shorter ones will be passed by, as seen at 17'. The stubs of those cut off are seen at 17". The spears 17, which are disposed substantially at right angles to the belts 16 at the time of being cut by the snares 18, remain substantially at right angles to the belts, as they are carried upwardly and rearwardly on the flight 32 to the drop zone 27 over container 19 or conveyer belt, as indicated by the dotted line showings of spears in FIG. 1. It should be obvious that when the spears 17 are released at 27 for dropping, being inclined forwardly, they will drop into place with the head ends forward, instead of being gathered in a hit or miss fashion in the container 19 or on the belt, and, consequently, it simplifies matters considerably in the further handling of these spears. Also, it must be evident that since the spears drop with the cut lower end down, there is less likelihood of any damage being suffered by the tender head ends of the spears as the tougher lower ends bear the brunt of what little impact is involved in the short drop to which each spear is subjected.

Referring to FIG. 4, showing one of the snares 18 in perspective, it will be seen that the front end portion of each of the two side members 33 of the snare is clamped, as at 34, to one side portion of a divider 29, the other member of the snare being similarly secured to the next divider, so that the snare 18 extends crosswise of the passageway 28 between the two dividers 29 and the related belts 16, and receives all of the seven inch or longer spears that enter this passageway 28, as, of course, all shorter spears 17' that do not reach the level of the flight 30 will stay outside the snare even though some of these may be in alignment with the passageway 28 under which the snare operates. To make certain that shorter spears 17' cannot enter the snare 18, there are two laterally spaced spring arms 35, one on each side of the front end portion of the snare 18, fastened by their hooked front ends 36 to the vertical supporting arms 37 of the dividers 29 under the nuts 38 on the lower one of two vertically spaced bolts 39 provided for fastening the arms 37 to the cross-member 40 provided on the frame 7 in forwardly spaced relation to the front bank of pulleys 21. The spring arms 35 extend downwardly and rearwardly from the support 40 for connection with the side members 33 of the snare at 41 at the entrance to the passageway 28, thereby keeping the entrance to each snare closed against entry of shorter spears, like spear 17', and yet allowing spears of seven inches or longer length to enter as they enter the passageway 28, the short spears being too short to reach the snare's entrance, which, as seen in FIG. 1, is at the same elevation as the lowermost flight 30 of the belts. Inasmuch as springs 35 keep each snare closed when no spear of sufficient height has entered, it is obvious that all of the short spears, like 17', are by-passed as the snare snakes harmlessly in and out around and between standing spears of asparagus. Even the entry of a spear of sufficient length is not apt to open the trailing portion of the snare enough to catch any shorter spears; it is only the longer spears that get into the snares that are actually cut by the cutting means at the trailing ends of the snares. The side members 33 of each snare may be made of closely coiled spring wire having a certain stiffness and tending to stay straight but permitting flexing of the snare to the right or left from a central position in line with the passageway 28 as required by the location of spears 17 entered in the snare. For instance, the side members of each snare may be made of nylon or some other durable flexible plastic material having substantially the same resilience and flexibility as the closely coiled spring referred to. Thus, in an experiment, speedometer cable was used with reasonably good success, it having the desired flexibility and springiness, and being of approximately the right diameter also, but being too limber. The cutting blades 42 provided at the trailing end of the snare are like those shown in FIG. 5 to which reference is now made. It will suffice to state at this point that the cutting end 42 of each snare drags on the ground as indicated in FIG. 1 to cut the spears 17 off at or near ground level, as at 17".

In FIG. 5, the cutting blades 42 for snare 18 are disclosed as being of a scissors type, overlapping to the extent indicated at 43 and defining a V between their forwardly diverging front end portions, as indicated at 44, into which the lower end of the spear 17 of asparagus will enter to be cut off simultaneously from opposite sides at or about ground level as the snare 18 is pulled forwardly relative to the spear in the forward movement of the machine. The torsion spring 45 is comparable to what is provided on a safety pin and has two forwardly extending arms 46 that are suitably secured, as indicated at 47, to the trailing end portions of the side members 33 of the snare. Should there be any need for opening up of the blades 42 due to the size or toughness of the spear of asparagus 17, these spring arms 46 permit such separation and they return the blades immediately after the cutting operation to their initial position.

In FIG. 6, the generally L-shaped blade 48 for snare 18' is shown suitably connected along the longitudinally extending leg to the trailing end portion of one of the side members 33, as indicated at 49, and suitably connected to the trailing end of the other side member 33, as indicated at 50. The spear 17 of asparagus is first contacted by the curved front end 51 of the cutting edge and thereafter is sliced off more or less along the longitudinal cutting edge 52 and whatever remaining portion has to be cut off is cut at 53 by the transversely extending end portion of the cutting edge.

In FIG. 7, a blade holder 54 for snare 18" is shown as suitably secured to the trailing ends of the side members 33 of the snare, the holder 54 permitting insertion of a straight-edged blade 55 from either side, so that new blades can be substituted easily for old ones, similarly as in injector type razors.

In operation, looking principally at FIGS. 1 to 4, the machine moves forward in the direction of the arrow 56, FIG. 1, and with the multiplicity of closely spaced parallel belts 16 cooperating in the manner described to provide the large number of closely spaced parallel passageways 28 therebetween, all spears 17 of a length seven inches or longer that occur in the width of the bed will be harvested, the shorter spears, like that indicated at 17' in FIG. 1, being passed up without any damage being done to the tender head ends thereof. These shorter spears 17', even if they are almost long enough to reach the lower flight 30 of the belts, will not be cut off or even nicked because the snares 18 are closed at the entrance end 41 of the passageways 28 by the spring action of the arms 35, and to whatever small extent a spear 17 of proper length will cause separation of the side members 33 of a snare, that is hardly enough opening in a snare to give rise to any danger of any shorter spears 17' entering these snares. The snares 18, being quite flexible from the point 41 rearwardly to the trailing end, where the cutting blades 42 are provided, will veer or snake harmlessly in and out, around and between standing spears of asparagus to the right or left from the longitudinal center line of the passageway 28 to whatever small extent is necessary to cut whatever spears 17 don't happen to be directly on this line, and, of course, due to the small spacing of the passageways 28, it is obvious that the spears 17 won't have to flex much nor will the snares 18 have to flex very far in either direction from a straight line. The spears 17 are cut before they reach pulleys 22 at the end of flight 30 and then they are conveyed upwardly and rearwardly in flight 32, as indicated in dotted lines in FIG. 1, and are finally released at 27 where they reach the end of the shorter belts *a* at pulley 24 and drop into the container 19 or onto a conveyer belt at that location in the rear portion of the frame 7. Whether the blades are like those shown at 42 in FIG. 5, or like that shown at 48 in FIG. 6, or like that shown at 55 in FIG. 7, the spears 17 caught in the snares 18 are bound to be cut off cleanly at or about ground level as the machine moves forward as the cutting blades come into contact with one after another of the spears entered in these snares.

In conclusion, it should be understood that, in its broader concept, my invention consists in providing the generally parallelogram shaped guide structure in a vertical plane seen in FIG. 1 with spear gripping belts operating on the periphery thereof in pairs, as disclosed in FIG. 1, whereby to provide the horizontal flight of belts on the bottom of the parallelogram at a predetermined elevation with respect to the ground, where the spears are grabbed and cut, followed by an upwardly inclined flight of belts on the back of the parallelogram, where the freshly cut spears are conveyed upwardly to a suitable elevation before being dropped either into a container or onto a conveyer belt, the inclination of the spears during conveyance with the upwardly inclined flight of belts to the point of dropping being of advantage from the standpoint that the head ends are always disposed in one direction and there is less likelihood of damage being done to these spears when they land on their tougher lower ends in the container or on the conveyer belt.

It is believed the foregoing description conveys a good understanding of the objects and advantages of my invention. The appended claims have been drawn to cover all legitimate modifications and adaptations.

I claim:

1. In an asparagus harvester, the combination of a supporting frame, a geometrical shaped guide structure for drive belts carried on said frame in a substantially vertical plane providing a horizontal lower portion at a predetermined elevation with respect to the ground and an upwardly inclined rear portion extending from the rear end of the horizontal lower portion, drive belts operating on the periphery of said guide structure so as to provide a horizontal flight at a predetermined elevation with respect to the ground extending into an upwardly inclined rear flight, drive means driving said belts, asparagus gripper belts of softer material than said drive belts carried on the periphery thereof and projecting laterally therefrom for gripping contact with opposite sides of standing spears of asparagus, means supporting said frame for forward travel at substantially the same ground speed at which said gripper belts operate, whereby the standing spears of asparagus are gripped between the belts in the horizontal flight and remain so gripped as the machine moves forward, snare means on said supporting frame for first singling out and segregating for cutting one after another of the spears of asparagus whose upper end portions are gripped between the belts so that they may be cut before they reach the end of the horizontal flight of the gripper belts, a cutter carried by said snare means for cutting them off at their lower ends so that the cut spears will be conveyed by the belts upwardly in the inclined flight to a point of release, and means below the point of release to catch the cut spears when released.

2. An asparagus harvester as set forth in claim 1 wherein the snare means comprises a separate snare for each pair of neighboring gripper belts, the snare moving with the frame and having a front entrance portion at the approximate level of the horizontal flight of gripper belts, the snare extending downwardly and rearwardly from the entrance on an incline and having a rear end portion, the latter including the cutter operable approximately at ground level to cut only those spears of asparagus in the snare at the lower ends thereof while their upper ends are held between the gripper belts.

3. An asparagus harvester as set forth in claim 1 wherein the snare means comprises a separate snare for each pair of neighboring gripper belts, the snare moving with the frame and having a front entrance portion at the approximate level of the horizontal flight of gripper belts, the snare extending downwardly and rearwardly from the entrance on an incline and having a rear end portion, the latter including the cutter operable approximately at ground level to cut only those spears of asparagus in the snare at the lower ends thereof while their upper ends are held between the gripper belts, each snare including side members and spring means carried on said frame on opposite sides of the snare tending to hold the side members of the snare together at the entrance where the spears of asparagus of sufficient length to reach and be gripped in the horizontal flight of the gripper belts enter between said gripper belts, whereby to avoid entry in the snare of those spears of asparagus of shorter length.

4. An asparagus harvester as set forth in claim 1 wherein the snare means comprises a separate snare for each pair of neighboring gripper belts, the snare moving with the frame and having a front entrance portion at the approximate level of the horizontal flight of gripper belts, the snare extending downwardly and rearwardly from the entrance on an incline and having a rear end portion, the latter including the cutter operable approximately at ground level to cut only those spears of asparagus in the snare at the lower ends thereof while their upper ends are held between the gripper belts, the snare comprising a pair of flexible side members dragging on the ground at their trailing ends, the same being sufficiently flexible to veer to the right or left from a longitudinal line coinciding with the space between the pair of gripper belts with which the snare cooperates, whereby to have the cutter on the trailing end cut off whatever spears are disposed in the snare.

5. An asparagus harvester as set forth in claim 1 including dividers carried on the frame and projecting forwardly from the front end of the horizontal flight of gripper belts, each divider being disposed in alignment with a gripper belt to deflect laterally standing spears disposed in the path of said dividers, some to the left and some to the right to be gripped between a pair of gripper belts, each snare comprising a pair of flexible side members attached to a pair of dividers and dragging on the ground at their trailing end, the same being sufficiently flexible to veer to the right or left from a longitudinal line coinciding with the space between the pair of gripper belts with which the snare cooperates, whereby to have the cutter on the trailing end cut off whatever spears are disposed in the snare.

6. An asparagus harvester as set forth in claim 1 wherein the snare means comprises a separate snare for each pair of neighboring gripper belts, the snare moving with the frame and having a front entrance portion at the approximate level of the horizontal flight of gripper belts, the snare extending downwardly and rearwardly from the entrance on an incline and having a rear end portion the latter including the cutter operable approximately at ground level to cut only those spears of asparagus in the snare at the lower ends thereof while their upper ends are held between the gripper belts, the cutter comprising two scissors-like blades in a V-formation opening forwardly to cut a spear of asparagus from the rear as the snare moves forward.

7. An asparagus harvester as set forth in claim 1 wherein the snare means comprises a separate snare for each pair of neighboring gripper belts, the snare moving with the frame and having a front entrance portion at the approximate level of the horizontal flight of gripper belts, the snare extending downwardly and rearwardly from the entrance on an incline and having a rear end portion, the latter including the cutter operable approximately at ground level to cut only those spears of asparagus in the snare at the lower ends thereof while their upper ends are held between the gripper belts, the cutter comprising two scissors-like blades in a V-formation opening forwardly to cut a spear of asparagus from the rear as the snare moves forward, the two blades being carried on a pair of spring arms that are connected together but flexible laterally away from one another so as to allow separation of said blades.

8. An asparagus harvester as set forth in claim 1 wherein the snare means comprises a separate snare for each pair of neighboring gripper belts, the snare moving with the frame and having a front entrance portion at the approximate level of the horizontal flight of gripper belts, the snare extending downwardly and rearwardly from the entrance on an incline and having a rear end portion, the latter including the cutter operable approximately at ground level to cut only those spears of asparagus in the snare at the lower ends thereof while their upper ends are held between the gripper belts, the cutter comprising a generally L-shaped blade, one arm of which extends in a forward direction in the trailing end of the snare and has a cutting edge along its inner side and front end, the other arm of the L extending transversely at the rear end of the first arm and having a cutting edge on the front thereof.

9. An asparagus harvester as set forth in claim 1 wherein the snare means comprises a separate snare for each pair of neighboring gripper belts, the snare moving with the frame and having a front entrance portion at the approximate level of the horizontal flight of gripper belts, the snare extending downwardly and rearwardly from the entrance on an incline and having a rear end portion, the latter including the cutter operable approximately at ground level to cut only those spears of asparagus in the snare at the lower ends thereof while their upper ends are held between the gripper belts, the cutter on the trailing end of the snare including a blade holder extending transversely of the trailing end of the snare, and a cutting blade removably mounted in said holder having a sharp forward cutting edge extending transversely of the trailing end of the snare.

10. A snare for use with a harvester of the character described moving over the ground along a predetermined line with respect to the crop projecting upwardly from the ground, said snare comprising a pair of elongated easily flexible side members extending longitudinally relative to the harvester and having upwardly diverging front end portions between which a standing element of the crop to be harvested is adapted to enter as the snare moves forwardly with the harvester, the flexible side members being normally disposed in close side by side relation rearwardly from the diverging front end portions and adapted to drag on the ground at their trailing ends, the side members being sufficiently easily flexible to veer or snake to the right or left from the line of forward travel of the harvester to get around and between other standing elements of the crop, and cutting means on the trailing end of the snare.

11. A snare as set forth in claim 10, including spring means for urging the side members of the snare toward each other in the region of convergence of the diverging front end portions of said side members.

12. A snare as set forth in claim 10, wherein the cutter means comprises two scissors-like blades in a V-formation opening forwardly to cut the snared element of the crop from the rear as the snare moves forward.

13. A snare as set forth in claim 10, wherein the cutter means comprises a generally L-shaped blade, one arm of which extends in a forward direction in the trailing end of the snare and has a cutting edge along its inner side and front end portion, the other arm of the L extending transversely at the rear end of the first arm, having a cutting edge on the front thereof so as to cut the snared element of the crop from the rear as the snare moves forward.

14. A snare as set forth in claim 10, wherein the cutting means on the trailing end of the snare includes a blade holder extending transversely of the trailing end of the snare, and a cutting blade removably mounted in said holder having a sharp forward cutting edge extending transversely of the trailing end of the snare so as to cut the snared element of the crop from the rear as the snare moves forward.

15. A snare as set forth in claim 10, wherein the side members of the snare are of readily flexible and resilient rod construction adapted to flex to S-shape or sinuous form to snake around and between standing crop elements without damaging the same.

16. A snare as set forth in claim 15, wherein the side members of the snare are of a rod material having easily flexing and springing characteristics comparable to speedometer cable.

References Cited
UNITED STATES PATENTS

| | | | |
|---|---|---|---|
| 1,059,589 | 4/1913 | Bang | 56—229 |
| 1,247,382 | 11/1917 | Doane et al. | 56—229 |
| 2,525,018 | 10/1950 | Corwin | 171—3 |
| 2,791,878 | 5/1957 | Kepner | 56—327 |
| 3,066,469 | 12/1962 | Chatagnier | 56—327 |
| 3,176,456 | 4/1965 | Franzen | 56—327 |

RUSSELL R. KINSEY, *Primary Examiner.*